No. 784,951. PATENTED MAR. 14, 1905.
A. A. LONG.
NUT LOCK.
APPLICATION FILED SEPT. 19, 1902.

WITNESSES:
C. J. Woodruff.
H. R. Selden,

INVENTOR
Adam A. Long,
BY Geo. B. Selden,
Attorney

No. 784,951. Patented March 14, 1905.

UNITED STATES PATENT OFFICE.

ADAM A. LONG, OF ROCHESTER, NEW YORK.

NUT-LOCK.

SPECIFICATION forming part of Letters Patent No. 784,951, dated March 14, 1905.

Application filed September 19, 1902. Serial No. 124,075.

*To all whom it may concern:*

Be it known that I, ADAM A. LONG, a citizen of the United States, residing at Rochester, in the county of Monroe, in the State of New York, have invented an Improved Nut-Lock, of which the following is a specification, reference being had to the accompanying drawings.

My invention relates to certain improvements in the construction of nut-locks, which improvements are fully described, and illustrated in the following specification and the accompanying drawings, the novel features thereof being specified in the claim annexed to the said specification.

Figure 1:
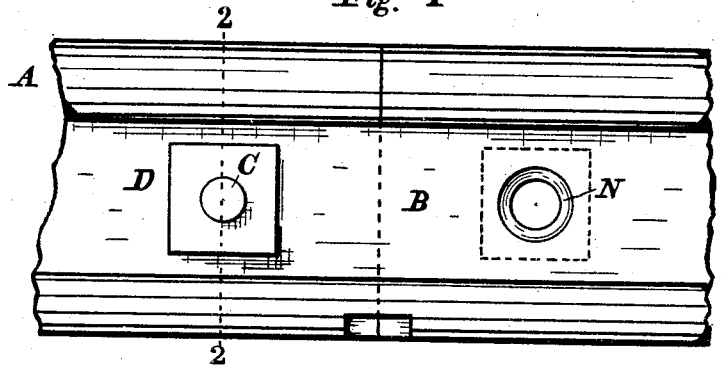
Figure 4:
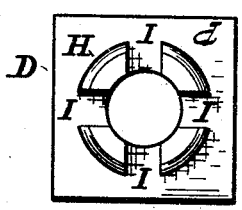
Figure 3:
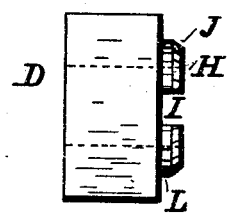
Figure 2:
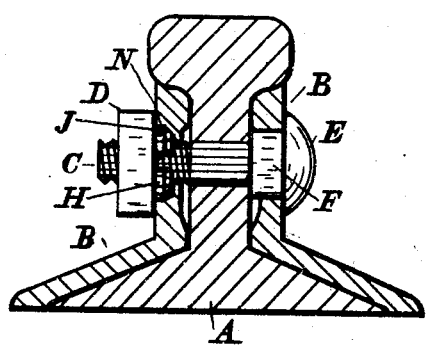

In the accompanying drawings, Figure 1 is a side view of a rail-joint with a locking device embodying my invention applied thereto. Fig. 2 is a section on the line 2 2, Fig. 1. Fig. 3 is a side elevation of the nut. Fig 4 is an inside view of the same.

My improved nut-lock is designed principally for use on the fish-plates of railways; but it is capable of many other applications.

In the accompanying drawings, A represents the rail; B B, the fish-plates; C, the bolt, and D the nut. The bolt is of any suitable style or size and provided with a suitable thread.

E, Fig. 2, is the head of the bolt, and F a square shoulder which fits a corresponding recess in the fish-plate and prevents the bolt from turning axially.

On the inside face *d* of the nut there is a circular projecting boss H, which is cut across by two or more grooves I of a depth corresponding with the height of the boss. The boss is thus divided into a number of projecting segments, each of which is capable of being independently forced inward against the bolt. The nut and the inner surfaces of the segments are threaded in the usual manner. The outer edges of the segments are beveled for a short distance, as indicated at J, Fig. 2, leaving the remaining portions of the outer surface of the boss straight or cylindrical, as shown at L. A conical recess N is formed in the outer surface of the fish-plate around the bolt-hole of a form corresponding with the beveled surface J. The recess is also made of such depth that when the nut is screwed home, so that the segments of the boss are forced firmly against the threads of the bolt, the inner surface or face *d* of the nut outside the boss bears strongly against the fish-plate. Thus it will be seen that when the nut is tightened a frictional contact exists between the engaging faces of the nut and plate, which holds the latter against becoming loosened, in addition to the gripping action of the segments on the bolt. I prefer to make the beveled surface J of a taper slightly different from that of the recess N, so that the bearing is as near as possible to the outer surface of the boss. As the pressure to spring the segments inward is applied at their free ends, they are forced to spring inward when the nut is screwed up, thereby causing them to grip the bolt securely. The recess may be uniformly tapered, or it may be made of a form corresponding more or less closely with that of the boss, avoiding contact except on the beveled surface J.

I claim—

The combination with a bolt and a nut having a cylindrical slotted projection on its inner face provided with a beveled edge, of a bearing-plate having a recess surrounding the bolt and an angular surface in the bottom thereof at such depth from the face of the plate that as the faces of the nut and plate frictionally engage the ends of the slotted projection also engage the angular surface and are forced into binding contact with the bolt.

ADAM A. LONG.

Witnesses:
GEO. B. SELDEN,
C. T. WOODRUFF.